D. B. NELSON.
Shovel.
No. 64,442. Patented May 7, 1867.
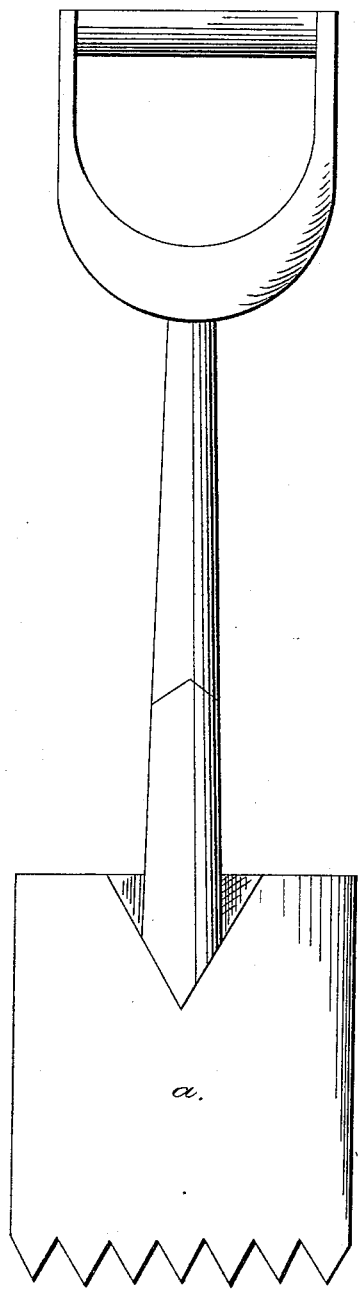
Witnesses:
F. Lehmann
Robt. Green
Inventor:
D. B. Nelson
Per
J. H. Alexander & Co
Attys.

United States Patent Office.

D. B. NELSON, OF ELMIRA, NEW YORK.

Letters Patent No. 64,442, dated May 7, 1867.

IMPROVEMENT IN SHOVELS.

The Schedule referred to in these Letters Patent and making part of the same.

TO ALL WHOM IT MAY CONCERN:

Be it known that I, D. B. NELSON, of Elmira, in the State of New York, have invented certain new and useful Improvements in Shovels; and I do hereby declare that the following is a full, clear, and exact description of the same, reference being had to the accompanying drawings, and to the letters of reference marked thereon, as forming a part of this specification, in which is represented a side elevation showing fully my invention.

The nature of my improvements consists simply in providing the cutting part of the shovel with teeth, which may be either angular, square, or semicircular. I prefer, however, forming the teeth angular.

A represents a shovel, which is provided upon its cutting surface with teeth, resembling those of an ordinary saw. The advantage of thus constructing a shovel is, that in entering the earth the teeth push aside the loose gravel which obstructs in a measure the working of the common shovel in gravelly soil. It also presents a very small cutting surface, which fact renders the use of it easy and light, where, in the common shovel, it would be difficult and heavy.

Having thus fully described my invention, what I claim, and desire to secure by Letters Patent, is—

Constructing shovel blades with teeth, substantially as and for the purpose set forth.

D. B. NELSON.

Witnesses:
    A. M. DE WITT,
    S. H. COTRELL.